United States Patent [15] 3,636,465
MacPherson [45] Jan. 18, 1972

[54] COMPENSATED NEGATIVE RESISTANCE DEVICE

[72] Inventor: Alan C. MacPherson, Alexandria, Va.

[73] Assignee: The United States of America as represented by the Secretary of the Navy

[22] Filed: Sept. 29, 1967

[21] Appl. No.: 671,889

[52] U.S. Cl. ....330/61 A, 330/34
[51] Int. Cl. ....H03f 3/12
[58] Field of Search ....330/61 A; 307/251, 304

[56] References Cited

UNITED STATES PATENTS

| | | | |
|---|---|---|---|
| 3,182,203 | 5/1965 | Miller | 330/61 X |
| 3,248,662 | 4/1966 | Brownell et al. | 330/61 |

*Primary Examiner*—Nathan Kaufman
*Attorney*—R. I. Tompkins and A. L. Branning

[57] ABSTRACT

A compensated one-port negative resistance device is obtained by using two negative elements spaced one-quarter wavelength apart so that identical changes in the two negative elements produce no first-order changes in the total impedance as viewed from the single port. The resulting device is used in a reflection-type amplifier which is more stable (for the same gain) than the corresponding amplifier in which a single negative resistance is the active element.

10 Claims, 5 Drawing Figures

INVENTOR
ALAN C. MACPHERSON
BY Kenneth E. Jacobs AGENT
R. S. Sciascia ATTORNEY

INVENTOR
ALAN C. MACPHERSON
BY Kenneth C. Jacob AGENT
[signature] ATTORNEY

INVENTOR
ALAN C. MACPHERSON
BY AGENT
ATTORNEY

COMPENSATED NEGATIVE RESISTANCE DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to stabilized negative resistance devices and more particularly to one-port negative resistance devices suitable for use in amplifiers or oscillators.

A typical prior art reflection-type negative resistance amplifier uses an active one-port negative resistance connected to one arm of a circulator with the source and load at the other two arms. The active one-port results from maser, tunnel diode or parametric diode action. The input signal passes through the circulator to the negative resistance device, and the reflected signal is diverted by the circulator to pass out to the load. The impedance of the circuit can be chosen so that the reflected signal will be greater than the incident signal so that a net power gain is obtained. The gain of such a circuit depends on the voltage reflection coefficient of the one-port and small changes in the impedance of the one-port can produce large changes in amplifier gain. The sensitivity of the amplifier with respect to the negative-conductance variation becomes more of a problem for high gain and becomes infinite at infinite gain. This implies that, for a high-gain amplifier, the fluctuation of the negative conductance must be kept to a minimum in order to reduce the amplitude and phase variations in the amplifier response.

SUMMARY OF THE INVENTION

The general purpose of this invention is to provide a negative resistance device using at least two active elements which has the first-order property that identical changes in the individual elements produce no change in the total negative resistance of the device. This stabilization is obtained by adding a second negative resistance device one-quarter wavelength from the first. The quarter-wavelength line inverts this second impedance with respect to the characteristic impedance of the line so that the total impedance, when viewed from the single port, includes one component which varies directly with a change in the individual impedances and another component which varies inversely with such a change.

The resulting compensated device can be used in any amplifier circuit of the negative resistance type with the guarantee that the resultant amplifier will be more stable (for the same gain) than the corresponding amplifier which uses only one negative resistance element. There would also be an improvement in the stability of any negative-resistance-type oscillator, particularly those of class A.

An object of the present invention is the provision of a composite one-port device, made up of plural impedance elements, which has the first-order property that identical changes in the individual impedance elements produce no changes in the total impedance of the one-port device.

Another object is to provide a compensated negative-resistance-type amplifier which is less sensitive to the variations in the negative resistance.

A further object of the invention is the provision of a more stable negative resistance oscillator.

Still another object is to provide a one-port impedance device with one impedance spaced along a transmission line from another impedance so that the total impedance when viewed from the one-port comprises one component which varies directly with the variation in the individual impedances and other component which varies inversely with such a variation.

Yet another object of the present invention is the provision of a reflection-type negative resistance amplifier using a one-port negative resistance device comprised of plural negative resistance elements with at least one of these elements spaced at an electrical distance which inverts the impedance of this element as viewed from the single port.

DESCRIPTION OF THE PREFERRED EMBODIMENTS

Figure 1:
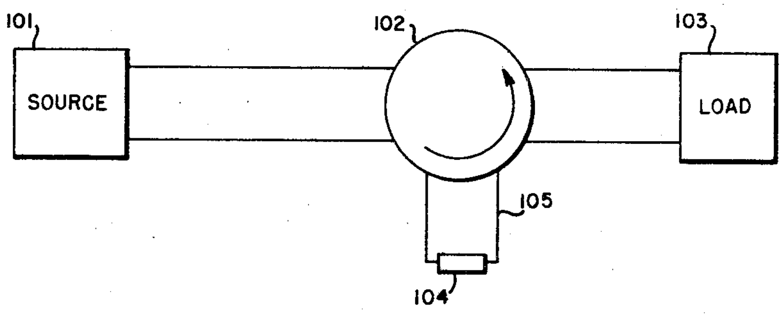
FIG. 1 (PRIOR ART)
FIG. 1 shows a prior art negative resistance reflection-type amplifier.

A prior art reflection-type amplifier is shown in FIG. 1 including signal source 101, circulator 102, load 103 and negative resistance device 104. The power gain P of such a circuit is given by the square of the magnitude of the voltage reflection coefficient, that is $$P=\left|\frac{Y_o-Y}{Y_o+Y}\right|^2 \qquad (1)$$

where $Y_o$ is the characteristic admittance of the connecting transmission line 105 and $Y$ is the admittance of the negative resistance circuit 104 that forms the terminating admittance of the line. For simplicity, it may be assumed that the amplifier is of the band-pass type and $Y=-G$ at the center frequency, where $G$ is the conductance of the circuit. The power gain equation then becomes $$P=\left|\frac{Y_o+G}{Y_o-G}\right|^2 \qquad (2)$$

and a large gain is obtained by adjusting $Y_o$ by means of an impedance transformer so that $Y_o$ is approximately equal to $|G|$. It can be seen that small changes in $G$ produce large changes in gain. The above equations can be written in terms of relative admittances with $y=Y/Y_o$ so that equation (1) becomes $$P=\left|\frac{1-y}{1+y}\right|^2 \qquad (3)$$

Figure 2:
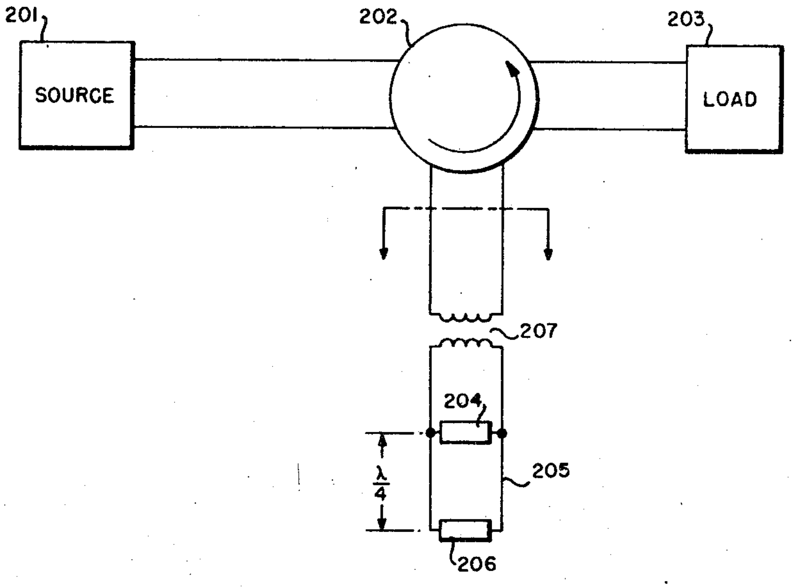
FIG. 2 shows a reflection-type amplifier constructed according to the present invention.

FIG. 2 shows a scheme according to the present invention for connecting two negative resistance elements to form a new one-port device, as seen at the broken line just below circulator 202 looking in the direction of the arrows, which has the property that identical changes in the two negative resistance elements produce no first-order change in the total impedance as viewed from the single port indicated by the dashed line. Transformer 207 is included so that the nominal value of the total relative admittance is approximately −1 mho.

The second negative resistance element 206 is spaced from the first negative resistance element 204 by a transmission line 205 whose electrical length is one-quarter wavelength (or 3/4, 5/4, 7/4 etc., wavelengths) so that when viewed from the port, the admittance of the second element appears inverted and the total admittance is equal to $$Y_t=y+1/y. \qquad (4)$$

From equation (4) it follows that $$dy_t=dy-dy/y^2 \qquad (5)$$

and $$\frac{dy_t}{y_t}=\frac{dy}{y}\frac{(1-1/y^2)}{(1+1/y^2)} \qquad (6)$$

so that for $y^2\cong 1$, $dy_t/y_t$ can be arbitrarily small for finite $dy/y$.

It should also be clear that the two negative admittances making up $y_t$ do not need to be equal—however, their fractional changes should be substantially the same. For example, if the second admittance is $k$ times the first, equations (4) and (6) become $$y_t=y+1/ky \qquad (4')$$

and $$\frac{dy_t}{y_t}=\frac{dy}{y}\frac{(1-1/ky^2)}{(1+1/ky^2)} \qquad (6')$$

In this case $dy_t/y_t$ can be made arbitrarily small by setting $ky^2$ approximately equal to 1.

Insofar as gain, gain stability, bandwidth, and gain compression are concerned, the circuit of FIG. 2, employing one circulator, has, to first order, the same advantages over the conventional single stage of FIG. 1 as does a tandem connection of two conventional stages requiring two circulators.

It is also known that, if two similar amplifiers are cascaded, they will saturate at a higher level than a single amplifier having the same gain as the cascade. It can be shown that, for the same gain, the gain compression improvement which accrues from using the compensated amplifier of this invention is identical to the improvement derived from the cascade connection.

Figure 3:
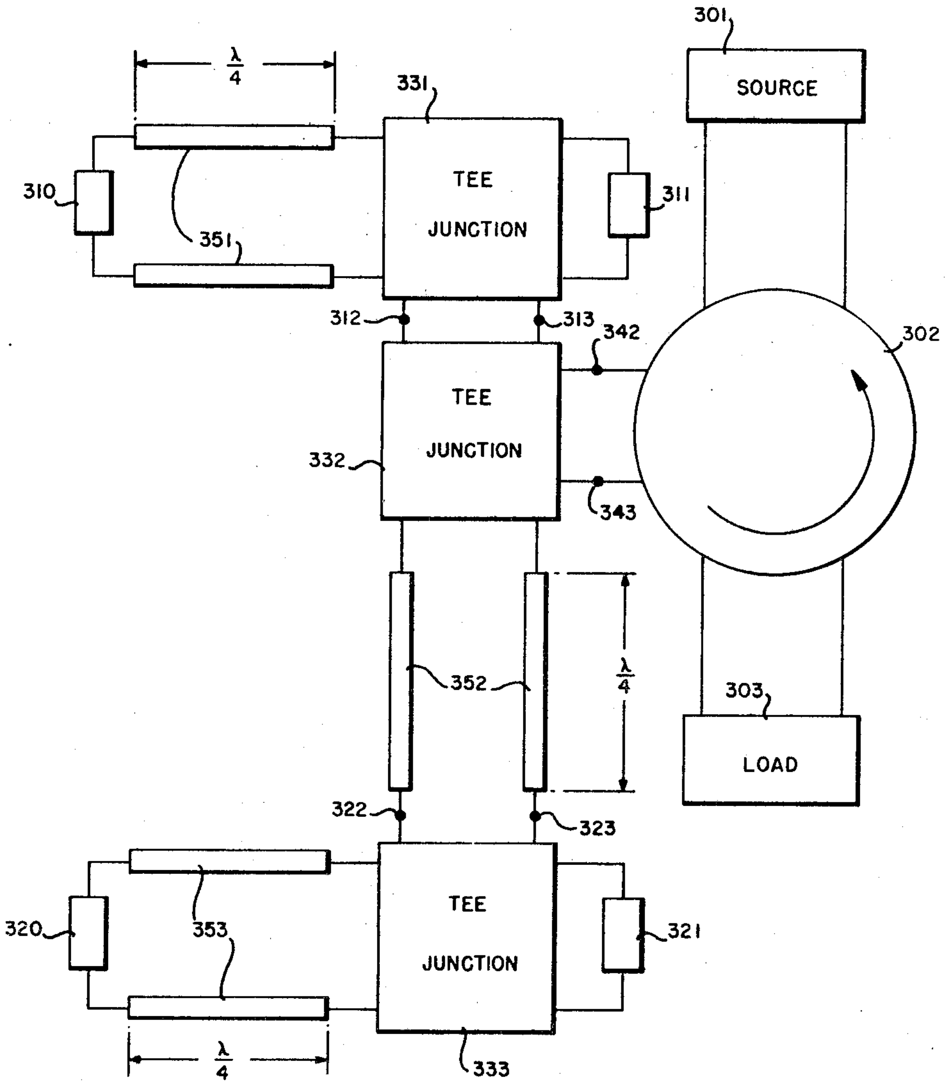
FIG. 3 shows a reflection-type amplifier embodying several one-port negative resistance devices according to the present invention.

An amplifier embodying the present invention has been shown in its simplest form in FIG. 2, but more complex circuits can be constructed wherein several compensated negative resistance units may be used. FIG. 3 shows such an amplifier where negative resistance elements 310–311 are electrically spaced to form a compensated negative resistance unit when viewed from the single port illustrated by terminals 312–313 while elements 320–321 form another compensated unit when viewed from terminals 322–323. The two one-port units are in turn connected to tee-junction 332 so as to form a further compensated negative resistance unit when viewed from terminals 342–343. This composite one-port unit may then be used as a reflection-type amplifier with circulator 302 in much the same manner as shown in FIG. 2.

Figure 4:
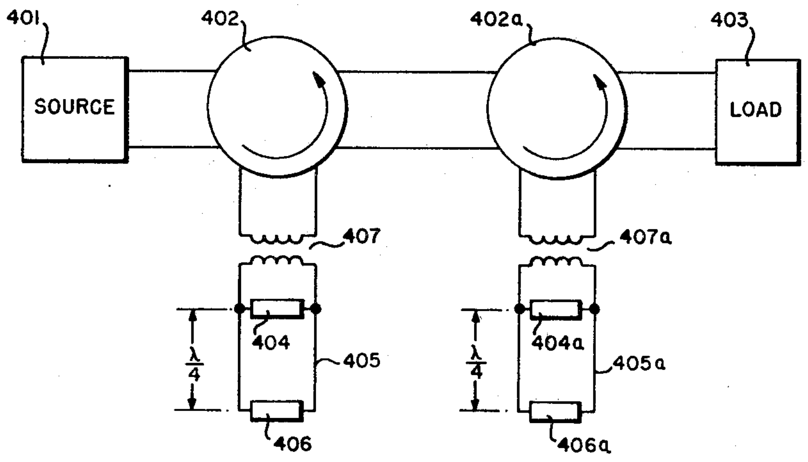
FIG. 4 shows two amplifiers according to the present invention connected in cascade.

FIG. 4 shows how two amplifiers like the one shown in FIG. 2 may be cascaded just as the prior art amplifiers according to FIG. 1 could be cascaded.

Figure 5:
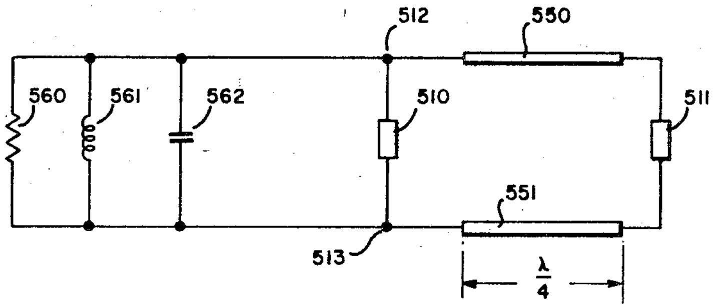
FIG. 5 shows an oscillator stabilized according to the present invention.

The one-port compensated negative resistance unit may also be used in one-port oscillators which consist of a single-port circuit that exhibits a negative real component of input admittance or impedance in a portion of its operating range, shunted by a parallel or series resonator (resonant circuit). A simple oscillator of this type is shown in FIG. 5 where negative resistance elements 510 and 511 together form a negative resistance unit whose resistance is stabilized according to the present invention. Negative resistance 511 is electrically spaced from the single-port terminals 512–513 by lines 550–551 so that the impedance of 511 is inverted and the total impedance as viewed from the single port has no first-order variations with equal changes in the values of negative resistances 510 and 511. By increasing the stability of the composite negative resistance, the stability of the oscillator itself is enhanced. Inductor 561 and capacitor 562 represent the resonant circuit while resistor 560 represents the load supplied by the oscillator.

The individual negative resistance elements in any of the circuits described above may be achieved in various ways. For example, masers, tunnel diodes, or parametric diode action may be used. Likewise, the electrical spacing of the elements may be achieved in a number of different ways such as by using waveguides, coaxial cables, etc.

In conclusion, therefore, there has been disclosed a system for stabilizing negative resistance units for use wherever it is desirable to minimize variations in impedance values. Obviously many modifications and variations of the present invention are possible in the light of the above teaching. It is therefore to be understood that within the scope of the appended claims, the invention may be practiced otherwise than specifically described.

What is claimed and desired to be secured by Letters Patent of the United States is:

1. A compensated one-port negative resistance device comprising:

- a single port for said device through which input signals are applied and output signals are taken,
- a first negative resistance element connected at substantially zero electrical distance from said single port; and
- a second negative resistance element, in parallel with said first negative resistance element, connected at an electrical distance equal to $n/4$ wavelength of the input signal from said single port, wherein $n$ is an odd integer;

whereby the admittance of said compensated single-port device remains constant.

2. The compensated, one-port negative resistance device of claim 1 including circulator means to apply input signals to said single port and receive output signals from said single port.

3. The compensated one-port negative resistance device of claim 2 wherein said circulator has at least three ports.

4. The compensated one-port negative resistance device of claim 3 wherein a signal source is connected to one port of said circulator, a load is connected to another port of said circulator, and the first negative resistance element is connected to still another port of said circulator.

5. The compensated one-port negative resistance device of claim 2 wherein said means to apply and receive signals comprises a resonant circuit which is part of an oscillator.

6. A compensated one-port negative resistance device comprising:

- a single port for said device through which input signals are applied and output signals are taken;
- a multiple-port junction having a first port connected to said single port;
- a first pair of negative resistance elements connected to a second port of said multiple-port junction;
- a first electrical transmission line connected between said first pair of negative resistance elements and having an electrical length equal to $n/4$ wavelengths of the applied input signal, wherein $n$ is an odd integer;
- a second pair of negative resistance elements connected through a second transmission line to a third port of said multiple-port junction, said second transmission line having an electrical length equal to $n/4$ wavelengths of the applied input signal, wherein $n$ is an odd integer;
- a third electrical transmission line connected between said second pair of negative resistance elements and having an electrical length equal to $n/4$ wavelengths of the applied input signal, wherein $n$ is an odd integer; and
- means to apply input signals to said single port and receive output signals from said single port.

7. The compensated one-port negative resistance device of claim 6 wherein said means to supply and receive signals is a circulator.

8. The compensated one-port negative resistance device of claim 7 wherein said circulator has at least three ports.

9. The compensated one-port negative resistance device of claim 8 wherein a signal source is connected to one port of said circulator, a load is connected to another port of said circulator, and the multiple-port junction is connected to still another port of said circulator.

10. A reflection-type negative resistance amplifier comprising:

- circulator having at least three ports, a first one of said ports being adapted to receive an input signal and a second one of said ports being adapted to emit an output signal; and
- a one-port negative resistance device connected to a third port of said circulator, said negative resistance device comprising at least two negative resistance elements placed in parallel with one of said elements being spaced from a second of said elements by an electrical length equal to $n/4$ wavelengths of the input signal, where $n$ is an odd integer.

* * * * *